US011907213B2

(12) United States Patent
Zhou et al.

(10) Patent No.: US 11,907,213 B2
(45) Date of Patent: *Feb. 20, 2024

(54) QUERY PROCESSING METHOD, DATA SOURCE REGISTRATION METHOD, AND QUERY ENGINE

(71) Applicant: HUAWEI TECHNOLOGIES CO., LTD., Guangdong (CN)

(72) Inventors: Bing Zhou, Shenzhen (CN); Wenwei Xue, Shenzhen (CN); Ting Yu Cliff Leung, San Jose, CA (US); Tao Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,031

(22) Filed: Jun. 6, 2022

(65) Prior Publication Data

US 2022/0300506 A1      Sep. 22, 2022

Related U.S. Application Data

(63) Continuation of application No. 16/663,050, filed on Oct. 24, 2019, now Pat. No. 11,366,808, which is a (Continued)

(30) Foreign Application Priority Data

Apr. 25, 2017   (CN) .......................... 201710274227.9

(51) Int. Cl.
*G06F 16/245*   (2019.01)
*G06F 16/28*    (2019.01)
(Continued)

(52) U.S. Cl.
CPC ...... *G06F 16/24524* (2019.01); *G06F 16/217* (2019.01); *G06F 16/24539* (2019.01);
(Continued)

(58) Field of Classification Search
None
See application file for complete search history.

(56) References Cited

U.S. PATENT DOCUMENTS 7,809,882 B1 * 10/2010 Liu .................... G06F 16/9574
                                                      707/753
9,348,880 B1 *  5/2016 Kramer ............... G06F 16/258
(Continued)

FOREIGN PATENT DOCUMENTS

CN      102156753 A     8/2011
CN      103902671 A     7/2014
(Continued)

OTHER PUBLICATIONS

Zong Shiqiang, "Data Sharing Based on Virtual View in Network", Command Information System and Technology, vol. 3, Issue 5, Oct. 31, 2012 (Oct. 31, 2012), with English translation. Total 16 pages.

(Continued)

*Primary Examiner* — Son T Hoang
(74) *Attorney, Agent, or Firm* — WOMBLE BOND DICKINSON (US) LLP

(57) ABSTRACT

A query processing method including decomposing an SQL into logical plans based on data source feature information, to obtain a logical plan set, where the data source feature information is stored in an internal storage space of the query engine; generating physical plans for the logical plan set based on the data source feature information, to obtain a physical plan set; determining query costs of the physical plan set based on the data source feature information, to obtain a physical plan with a highest priority; and executing the physical plan with the highest priority, to obtain a query result queried by a user.

15 Claims, 5 Drawing Sheets

Related U.S. Application Data continuation of application No. PCT/CN2018/084183, filed on Apr. 24, 2018.

(51) Int. Cl.
  *G06F 16/21* (2019.01)
  *G06F 16/2452* (2019.01)
  *G06F 16/2455* (2019.01)
  *G06F 16/2453* (2019.01)

(52) U.S. Cl.
  CPC .. *G06F 16/24545* (2019.01); *G06F 16/24562* (2019.01); *G06F 16/284* (2019.01)

(56) References Cited

U.S. PATENT DOCUMENTS

| | | | |
|---|---|---|---|
| 10,430,478 B1* | 10/2019 | Blalock | G06F 16/9566 |
| 2009/0094192 A1* | 4/2009 | Bestgen | G06F 16/24549 |
| 2012/0215763 A1 | 8/2012 | Hughes et al. | |
| 2012/0317096 A1 | 12/2012 | Kaufmann et al. | |
| 2013/0006966 A1 | 1/2013 | Kaufmann et al. | |
| 2013/0086039 A1* | 4/2013 | Salch | G06F 16/2455 707/E17.131 |
| 2015/0120699 A1 | 4/2015 | Faerber et al. | |
| 2015/0215314 A1* | 7/2015 | Pisharody | G06F 16/245 |
| 2016/0335163 A1* | 11/2016 | Teodorescu | G06F 16/2282 |

FOREIGN PATENT DOCUMENTS

| | | |
|---|---|---|
| CN | 105279286 A | 1/2016 |
| IN | 104142980 A | 11/2014 |
| WO | 2016015439 A1 | 2/2016 |

OTHER PUBLICATIONS

Anonymous "Spark SQL, DataFrames and Datasets Guide", Retrieved from the internet: http://spark.apache.org/docs/1.6.2/sql-programming-guide.html, on Dec. 20, 2019. total 20 pages.

* cited by examiner

QUERY PROCESSING METHOD, DATA SOURCE REGISTRATION METHOD, AND QUERY ENGINE

CROSS-REFERENCE TO RELATED APPLICATIONS

This application is a continuation of U.S. patent application Ser. No. 16/663,050, filed on Oct. 24, 2019, which is a continuation of International Application No. PCT/CN2018/084183, filed on Apr. 24, 2018. The International Application claims priority to Chinese Patent Application No. 201710274227.9, filed on Apr. 25, 2017. All of the aforementioned patent applications are hereby incorporated by reference in their entireties.

TECHNICAL FIELD

This application relates to the field of data query technologies, and in particular, to a query processing method, a data source registration method, and a query engine.

BACKGROUND

A query engine is a system of collecting information from a data source based on a specific policy and by using a specific computer program, then organizing and processing the collected information to provide a retrieval service for a user, and finally presenting information related to the user's retrieval to the user. A structured query language (SQL) query engine is used as an example. A general processing procedure of the query engine includes: (1) Receive an SQL initiated by a user, and parse and optimize the SQL, to obtain an optimized logical plan; (2) Decompose the logical plan into a plurality of different logical sub-plans (such as an SQL 1, an SQL 2, . . . , and an SQL n) based on differences in data sources; (3) Generate a physical plan for each logical sub-plan, to obtain at least one physical plan corresponding to each logical sub-plan; (4) Estimate costs of a plurality of physical plans, to select a physical plan with a highest priority, where the physical plan with the highest priority is a physical plan with minimum execution costs; (5) Execute the physical plan with the minimum costs, and then return an execution result of the physical plan; and (6) Calculate and combine execution results to obtain a total result set, and then return a query result to the user.

Currently, for access of a plurality of heterogeneous data sources and unification of data access interfaces, in some query engines, a corresponding "data supplier" component is customized and developed for each type of data source. In a query execution process, a real-time SQL request is sent to a data source by using the data supplier and a response to the real-time SQL request is parsed; or a capability of the data source is dynamically determined and recorded by monitoring historical load information of a query engine and the data source, the historical load information of the query engine and the data source is recorded, and query costs such as network latency and a response time of the data source are deduced based on the historical load information.

It can be learned that the data supplier in the foregoing manner is not in common use, and more suppliers lead to more data sources, causing relatively high labor costs. In addition, at least one assistant query needs to be introduced when the query engine performs one data query for the data source, and the query engine frequently interacts with the data source, causing large network communication overheads and the like.

SUMMARY

Embodiments of this application provide a query processing method, a data source registration method, and a query engine, to improve performance of the query engine.

According to a first aspect, an embodiment of this application provides a query processing method, including: determining, by a query engine, an SQL query manner based on data source feature information, and performing a query operation on an SQL in the determined query manner to obtain a query result, where the data source feature information is stored in an internal data source feature library of the query engine, and the internal data source feature library is stored in cache space of the query engine. It can be learned that the query engine only needs to perform the query operation on the SQL based on the data source feature information statically configured in the internal data source feature library. Compared with the prior art, in this solution, data source feature information does not need to be obtained by accessing a data source in real time during each SQL query, thereby greatly reducing overheads of remotely accessing the data source, and improving performance of the query engine.

In a possible implementation, a specific implementation in which the query engine determines the SQL query manner based on the data source feature information, and performs the query operation on the SQL in the determined query manner to obtain the query result is as follows: The query engine decomposes the structured query language SQL into logical plans based on the data source feature information, to obtain a logical plan set; the query engine generates physical plans for the logical plan set based on the data source feature information, to obtain a physical plan set; the query engine determines query costs of the physical plan set based on the data source feature information, to obtain a physical plan with a highest priority; and the query engine executes the physical plan with the highest priority, to obtain a query result of the SQL.

In a possible embodiment, the method further includes: importing, by the query engine, data source feature information in an external data source feature library into the internal data source feature library of the query engine, where the external data source feature library is stored in storage space of the query engine. It can be learned that the data source feature information is imported into the internal data source feature library of the query engine in advance, and subsequently the query engine only needs to perform the query operation on the SQL based on the data source feature information statically configured in the internal data source feature library, thereby improving performance of the query engine.

In a possible embodiment, at least two types of data source feature information are stored in a same internal data source feature library. It can be learned that there is no need to configure a data source feature library for each data source, thereby reducing resource overheads.

In a possible embodiment, the method further includes: configuring, by the query engine, at least two types of external data source feature information into the external data source feature library of the query engine based on a general registration template. It can be learned that there is no need to provide a dedicated registration module for each data source, thereby reducing resource overheads.

In a possible embodiment, before the decomposing the SQL, entered by a user, into logical plans based on the data source feature information, to obtain a logical plan set, the method further includes: obtaining, by the query engine, identification information of a data source referenced by the SQL; and reading, from the internal data source feature library based on the identification information of the data source, data source feature information corresponding to the data source referenced by the SQL. It can be learned that the data source feature information corresponding to the identification information of the data source may be quickly read by using the identification information of the data source.

In a possible embodiment, a specific implementation in which the query engine obtains the identification information of the data source referenced by the SQL is as follows: The query engine parses and optimizes the SQL to obtain an optimized logical plan, where the logical plan includes the identification information of the data source referenced by the SQL.

In a possible embodiment, when there are N data sources referenced by the SQL, the N data sources each correspond to one piece of data source feature information, where N is a positive integer, and a specific implementation in which the query engine decomposes the SQL into logical plans based on the data source feature information, to obtain the logical plan set is as follows: The query engine decomposes the SQL into logical plans based on N pieces of data source feature information, to obtain a logical plan set, where the logical plan set includes X logical plans, and X is a positive integer. It can be learned that logical plan decomposition is performed based on the data source feature information, and a plurality of optimal logical plans can be obtained, thereby further improving performance of the query engine.

In a possible embodiment, a specific implementation of the generating physical plans for the logical plans based on the data source feature information, to obtain a physical plan set is as follows: generating physical plans for the X logical plans based on the N pieces of data source feature information, to obtain a physical plan set, where the physical plan set includes Y physical plans, and Y is greater than or equal to X. It can be learned that the physical plans are generated based on the data source feature information, and a plurality of optimal physical plans can be obtained, thereby further improving performance of the query engine.

In a possible embodiment, a specific implementation of the determining query costs of the physical plan set based on the data source feature information, to obtain a physical plan with a highest priority is as follows: separately determining query costs of the Y physical plans based on the N pieces of data source feature information, to obtain a physical plan with a highest priority in the Y physical plans. It can be learned that the query costs are determined based on the data source feature information, and an optimal physical plan is more properly selected from a plurality of physical plans, thereby further improving performance of the query engine.

In a possible embodiment, a specific implementation of the executing the physical plan with the highest priority and performing data processing on an execution result of executing the physical plan with the highest priority, to obtain a query result queried by the user is as follows: executing the physical plan with the highest priority in the Y physical plans, to obtain N result sets; and reconstructing data of the N result sets based on a reconstruction function, to obtain the query result queried by the user.

In a possible embodiment, the data source feature information includes at least one of the following: identification information of a data source, a data source granularity, calculation that the data source allows to push down, calculation that the data source does not allow to push down, an SQL syntax used to push down calculation to the data source, cross-data center information of the data source, whether to provide cache support information for the data source, and whether to monitor load information of the data source.

In a possible embodiment, the data source granularity includes at least one of a file, a database, a table in the database, a row in the table, and a column in the table. It can be learned that the query engine may support data sources of a plurality of granularities in performing separate operations, thereby further improving performance of the query engine.

According to a second aspect, an embodiment of this application provides a data source registration method, including: configuring, by a query engine, external data source feature information into an external data source feature library of the query engine, where the external data source feature library is stored in storage space of the query engine; and importing, by the query engine, data source feature information in the external data source feature library into an internal data source feature library of the query engine, where the internal data source feature library is stored in cache space of the query engine, and at least two types of data source feature information are stored in a same internal data source feature library. It can be learned that the query engine configures the external data source feature information into the external data source feature library of the query engine, and then imports the data source feature information in the external data source feature library into the internal data source feature library of the query engine, so that the query engine may subsequently perform a query operation on an SQL based on the data source feature information statically configured in the internal data source feature library. Compared with the prior art, data source feature information does not need to be obtained by accessing a data source in real time during each SQL query, thereby greatly reducing overheads of remotely accessing the data source, and improving performance of the query engine. In addition, at least two types of data source feature information are stored in a same data source feature library, and there is no need to configure a data source feature library for each data source, thereby reducing resource overheads.

In a possible embodiment, a specific implementation in which the query engine configures the external data source feature information into the external data source feature library of the query engine is as follows: The query engine configures the external data source feature information into the external data source feature library of the query engine by using a tool program of the query engine, where at least two types of external data source feature information correspond to a same tool program. It can be learned that there is no need to configure a tool program for each piece of external data source feature information, thereby reducing resource overheads.

In a possible embodiment, a specific implementation in which the query engine imports the data source feature information in the external data source feature library of the query engine into the internal data source feature library of the query engine is as follows: The query engine imports the data source feature information in the external data source feature library of the query engine into the internal data source feature library of the query engine by using an importing program of the query engine, where at least two types of data source feature information correspond to a same importing program. It can be learned that there is no need to configure an importing program for each piece of data source feature information, thereby reducing resource overheads. In addition, the importing program of the query engine can access both the external data source feature library and the internal data source feature library. Therefore, by executing the importing program of the query engine, the query engine does not need to be restarted, and a data source feature registration procedure of updating the external data source feature library to the internal data source feature library in real time is dynamically completed.

In a possible embodiment, at least two types of external data source feature information are configured into the external data source feature library of the query engine based on a general registration template. It can be learned that there is no need to provide a dedicated registration module for each data source, thereby reducing resource overheads.

In one embodiment, the data source feature information includes at least one of the following: identification information of a data source, a data source granularity, calculation that the data source allows to push down, calculation that the data source does not allow to push down, an SQL syntax used to push down calculation to the data source, cross-data center information of the data source, whether to provide cache support information for the data source, and whether to monitor load information of the data source.

In one embodiment, the data source granularity includes at least one of a file, a database, a table in the database, a row in the table, and a column in the table. It can be learned that the query engine may support data sources of a plurality of granularities in performing separate operations, thereby further improving performance of the query engine.

According to a third aspect, this application provides a query engine, including modules that are configured to perform the method in the first aspect.

According to a fourth aspect, this application provides a query engine, including modules that are configured to perform the method in the second aspect.

According to a fifth aspect, this application provides a query engine. The network element includes a processor, and the processor is configured to support the network element in performing a corresponding function in the query processing method provided in the first aspect. The query engine may further include a memory. The memory is configured to couple to the processor, and stores a program instruction and data that are necessary for the query engine. The query engine may further include a communications interface used for communication between the query engine and another device or a communications network.

According to a sixth aspect, this application provides a query engine. The query engine includes a processor, and the processor is configured to support the network element in performing a corresponding function in the data source registration method provided in the second aspect. The query engine may further include a memory. The memory is configured to couple to the processor, and stores a program instruction and data that are necessary for the query engine. The query engine may further include a communications interface used for communication between the query engine and another device or a communications network.

According to a seventh aspect, this application provides a computer storage medium, configured to store a computer software instruction used by the query engine provided in the fifth aspect. The computer software instruction includes a program designed for performing the foregoing aspect.

According to an eighth aspect, this application provides a computer storage medium, configured to store a computer software instruction used by the query engine provided in the sixth aspect. The computer software instruction includes a program designed for performing the foregoing aspect.

It can be learned that the query engine only needs to perform the query operation on the SQL based on the data source feature information statically configured in the internal data source feature library. Compared with the prior art, in the solutions, data source feature information does not need to be obtained by accessing a data source in real time during each SQL query, thereby greatly reducing overheads of remotely accessing the data source, and improving performance of the query engine.

These aspects or other aspects of this application may be clearer in descriptions of the following embodiments.

BRIEF DESCRIPTION OF DRAWINGS

To describe the technical solutions in the embodiments of this application more clearly, the following briefly describes the accompanying drawings required for describing the embodiments of this application or the background.

DESCRIPTION OF EMBODIMENTS

Figure 1:
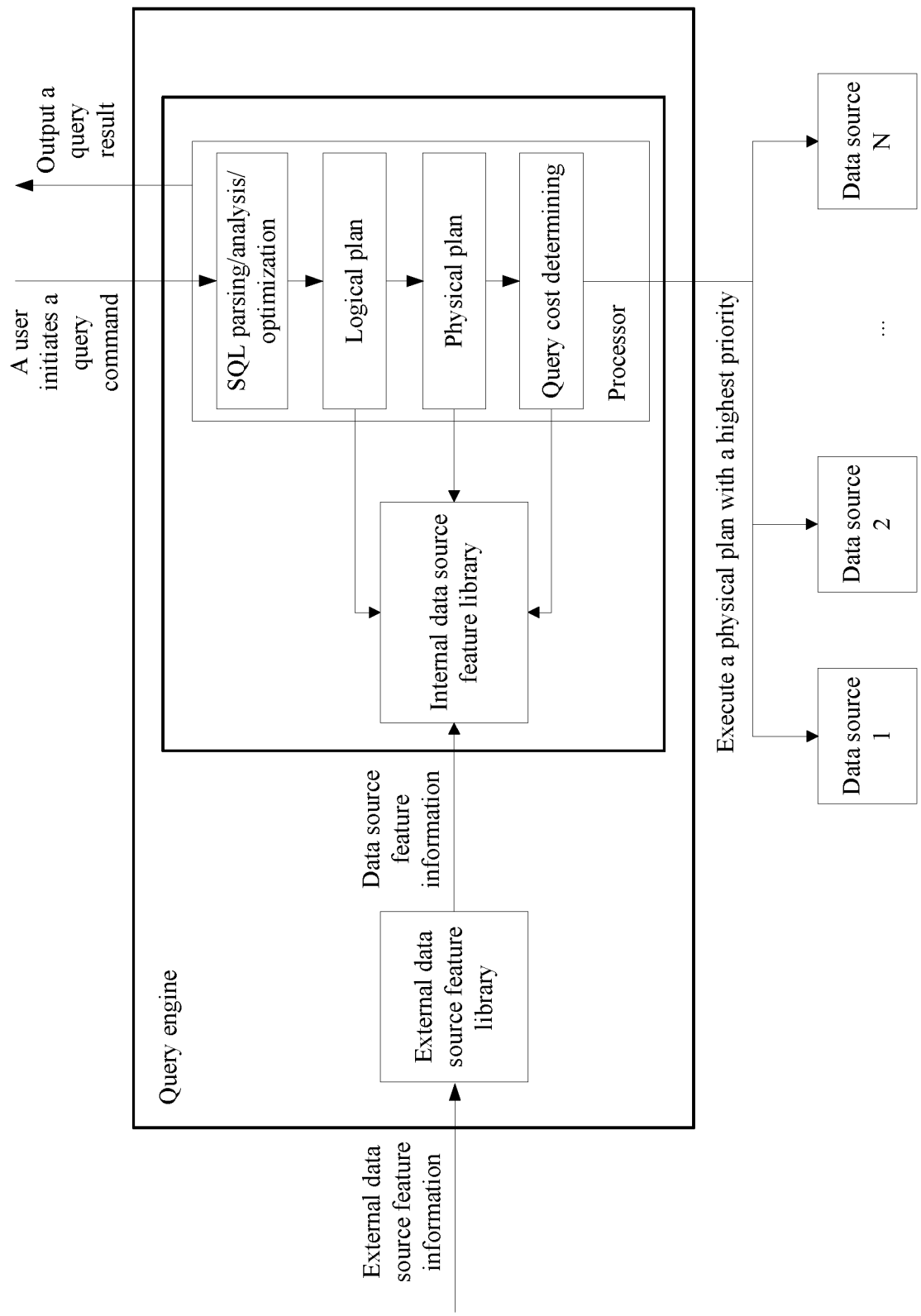
FIG. 1 is a schematic diagram of a logical architecture according to an embodiment of this application.

In the following, some terms in this application are described, to facilitate understanding by a person skilled in the art.

(1) A data source is a data unit of a different granularity that can be accessed by a query engine, such as a database, a table in the database, a row in the table, a column in the table, or a file in any storage format.

(2) Identification information of a data source is information that can uniquely identify the data source. The identification information of the data source includes connection information of the data source, and the connection information of the data source may include, for example, an access protocol (such as an HTTP or a JDBC), a URL, a user name, and a password.

(3) A data source granularity includes at least one of a file, a database, a table in the database, a row in the table, and a column in the table.

(4) Calculation that a data source allows to push down includes common SQL operations, such as Predicate, Projection, Aggregate, and Join.

(5) Calculation that a data source does not allow to push down includes common SQL operations, such as Predicate, Projection, Aggregate, and Join.

(6) An SQL syntax used to push down calculation to a data source may be described through pattern matching. Standard SQL pattern matching, a script regular expression (Perl, PHP, or the like), a Java regular expression, or the like in the prior art may be used for a syntax for pattern matching.

(7) Cross-data center information of a data source describes whether the data source and a query engine are deployed in a same data center, a network distance between the data source and the query engine under a normal condition, and the like.

(8) Whether to provide cache support information for a data source is used to indicate whether a remote data source allows a query engine to locally cache data of the data source, to accelerate query optimization.

(9) Whether to monitor load information of a data source indicates whether the data source allows a query engine to monitor load of the data source.

(10) A logical plan is "what to do" to decompose an entered SQL into a plurality of sub-targets. A physical plan is "how" to determine step-by-step implementations of a plurality of sub-targets.

(11) Cache (Cache) space is storage space that is allocated to a query engine for fast reading and writing to accelerate a reading/writing rate of the query engine. Generally, a rate at which the query engine reads/writes the cache space is higher than a rate of reading/writing storage space. Therefore, by directly reading the cache space, the query engine does not need to read corresponding data from the storage space again each time, thereby improving data reading/writing efficiency of the query engine. The cache space is usually disposed on a random access memory (random access memory, RAM), but in some implementations such as a virtual storage technology, all or some data stored in the cache space may be actually stored in an external memory such as a magnetic disk.

(12) Storage space of a query engine is a storage resource whose size is allocated by a system and that is used to store software data, a user profile, and a table. The storage space is usually grouped into an external memory such as a magnetic disk.

(13) "A plurality of" means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application with reference to the accompanying drawings in the embodiments of this application.

FIG. 1 is a schematic diagram of a logical architecture according to an embodiment of this application. The logical architecture includes a query engine and N data sources, where N is a positive integer. The query engine includes an internal data source feature library of the query engine, an external data source feature library of the query engine, and a processor. The logical architecture shown in FIG. 1 may be applied to query in a big data field. A query processing procedure of the query engine based on the logical architecture shown in FIG. 1 is as follows:

(1) The processor of the query engine configures external data source feature information into the external data source feature library of the query engine, where the external data source feature library of the query engine is stored in storage space of the query engine.

(2) The processor of the query engine imports data source feature information in the external data source feature library of the query engine into the internal data source feature library of the query engine, where the internal data source feature library of the query engine is stored in cache space of the query engine, and at least two types of data source feature information are stored in a same internal data source feature library.

(3) When the processor of the query engine subsequently receives a query command initiated by a user, the query command carries an SQL, and the processor of the query engine parses/analyzes/optimizes the SQL to obtain identification information of N data sources referenced by the SQL.

(4) The processor of the query engine reads data source feature information of the N data sources from the internal data source feature library of the query engine based on the identification information of the N data sources, and decomposes the SQL into logical plans based on the data source feature information of the N data sources.

(5) The processor of the query engine generates physical plans for a logical plan set based on the data source feature information of the N data sources, to obtain a physical plan set.

(6) The processor of the query engine determines query costs of the physical plan set based on the data source feature information of the N data sources, to obtain a physical plan with a highest priority.

(7) The processor of the query engine executes the physical plan with the highest priority, to obtain a query result of the SQL.

(8) The processor of the query engine outputs the query result.

It can be learned that the data source feature information is statically configured in the internal data source feature library of the query engine in advance, and subsequently the query engine only needs to perform a query operation on the SQL based on the data source feature information statically configured in the internal data source feature library. Compared with the prior art, in this solution, data source feature information does not need to be obtained by accessing a data source in real time during each SQL query, thereby greatly reducing overheads of remotely accessing the data source, and improving performance of the query engine.

Figure 2:
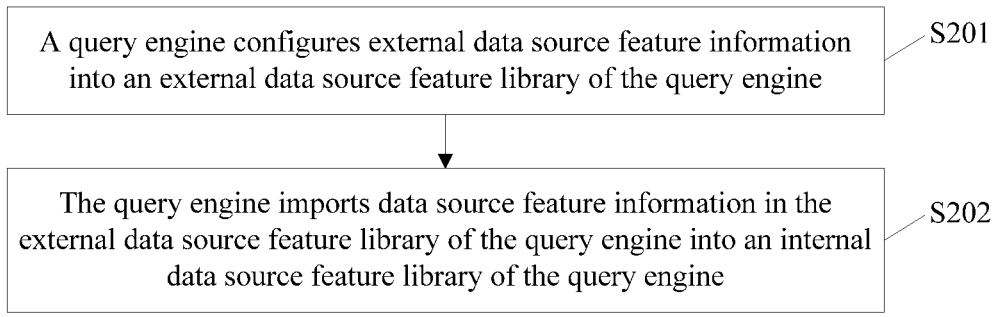
FIG. 2 is a schematic flowchart of a data source registration method according to an embodiment of this application.

FIG. 2 is a schematic flowchart of a data source registration method according to an embodiment of this application. The method includes the following operations:

Operation S201. A query engine configures external data source feature information into an external data source feature library of the query engine, where the external data source feature library is stored in storage space of the query engine.

Operation S202. The query engine imports data source feature information in the external data source feature library of the query engine into an internal data source feature library of the query engine, where the internal data source feature library is stored in cache space of the query engine, and at least two types of data source feature information are stored in a same internal data source feature library.

In an example of this application, a specific implementation of operation S201 is as follows: The query engine configures the external data source feature information into the external data source feature library of the query engine by using a tool program of the query engine, where at least two types of external data source feature information correspond to a same tool program.

"External" herein means outside the query engine, and a user can perform direct access, but the query engine cannot perform direct access. In hardware, the external data source feature library may be implemented in persistent storage such as an SSD or an HDD, in software, the external data source feature library may be implemented in a form of a file or a database, and physically, the external data source feature library may be disposed on a same node as the query engine or a separate node outside the query engine for implementation.

The tool program is a small program used by the query engine to perform a specific function. In this solution, the tool program is a small program used by the query engine to configure the external data source feature information into the external data source feature library of the query engine. In addition, at least two types of external data source feature information correspond to a same tool program. For example, every two types of external data source feature information correspond to a same tool program, or every three types of external data source feature information correspond to a same tool program, or every five types of external data source feature information correspond to a same tool program, or all external data source feature information corresponds to a same tool program. This is not limited in this application.

In an example of this application, a specific implementation of step S202 is as follows: The query engine imports the data source feature information in the external data source feature library of the query engine into the internal data source feature library of the query engine by using an importing program of the query engine, where at least two types of data source feature information correspond to a same importing program.

The query engine imports the data source feature information in the external data source feature library into the query engine by using the importing program of the query engine, to form the internal data source feature library. "Internal" herein means inside the query engine, and the query engine can perform direct access. In hardware, a RAM memory may be used for implementation to ensure performance. In software, a data structure such as a hash table (hash table) or a dictionary tree may be used for implementation. The importing program of the query engine can access both the external data source feature library and the internal data source feature library. By executing the importing program of the query engine, the query engine does not need to be restarted, and a data source feature registration procedure of updating the external data source feature library to the internal data source feature library in real time is dynamically completed.

The importing program is a small program used by the query engine to perform a specific function. In this solution, the importing program is a small program used by the query engine to import the data source feature information in the external data source feature library into the internal data source feature library of the query engine. In addition, at least two types of data source feature information correspond to a same importing program. For example, every two types of data source feature information correspond to a same importing program, or every three types of data source feature information correspond to a same importing program, or every five types of data source feature information correspond to a same importing program, or all data source feature information corresponds to a same importing program. This is not limited in this application.

In an example of this application, the external data source feature information is recorded based on a general registration template. There is no need to provide a dedicated registration module for each data source (such as MySQL, DB2, and Oracle), and only the general registration template needs to be used, thereby reducing resource overheads.

In an example of this application, the data source feature information is feature information indicating that a data source is different from another data source, and the data source feature information includes at least one of the following: identification information of the data source, a data source granularity, calculation that the data source allows to push down, calculation that the data source does not allow to push down, an SQL syntax used to push down calculation to the data source, cross-DC information of the data source, whether to provide cache support information for the data source, and whether to monitor load information of the data source.

The identification information of the data source is a necessary feature that distinguishes one data source from another data source. All features in the data source feature information except the identification information of the data source are optional data source features. If there is a related configuration of an optional feature in the data source feature library, the query engine makes a query decision based on this definition. If there is no related configuration in a data source feature library, the query engine makes a query decision in a system default manner. In addition to the identification information of the data source, any other identification information that can uniquely identify a data source may be used in this embodiment of this application.

After operation S202, the query engine may access the internal data source feature library by using a unique connection identifier (data source connection information) of the data source, to obtain a related feature configuration of the data source. Subsequently, the query engine may make a query decision based on the related feature configuration of the data source.

In the solution provided in this embodiment of this application, the query engine configures the external data source feature information into the external data source feature library of the query engine, and then imports the data source feature information in the external data source feature library into the internal data source feature library of the query engine, so that the query engine may subsequently perform a query operation on an SQL based on the data source feature information statically configured in the internal data source feature library. Compared with the prior art, data source feature information does not need to be obtained by accessing a data source in real time during each SQL query, thereby greatly reducing overheads of remotely accessing the data source, and improving performance of the query engine. In addition, different data source feature information is stored in a same data source feature library, thereby reducing resource overheads.

For example, the external data source feature library may be implemented by using a file or a database table. The following shows an example of a manner in which the external data source feature library is implemented by using an XML file. The XML file includes feature descriptions of three different data sources, and the different data sources correspond to different data source granularities.

```
<DataSourceConfig>
    <datasource> //A first data source is mysql
        <connection> //Identification information of the data source
            <url>jdbc:mysql://mysql_host: 3306/mysqldb</url>
            <user>mysql_user</user>
            <password>mysql_password</password>
            <dbtable>*</dbtable> //A data source granularity is a table (set)
        </connection>
        <pushdown> //Feature information indicating whether to allow to push down calculation
```

-continued

```
        <predicate>on</predicate> //Predicate
        <project>off</project>    //Project
        <aggregate>off</aggregate> //Aggregate
        <groupby>on</groupby> //Group
        <having>off</having> //Condition
        <join>on</join> //Join
        <set>off</set> //SQL set operations, such as union, except, and
            intersect
      </pushdown>
      <crossdc>no</crossdc> //Whether the data source and a query engine
are not in a same data center (DC)
      <cache>yes</cache> //Whether to allow the query engine to locally
cache data of the data source
    </datasource>
    <datasource> //A second data source is postgresql
      <connection>
        <url>jdbc:postgresql ://mppdb_host:8000/mppdb</url>
        <user>mppdb_user</user>
        <password>mppdb_password</password>
        <dbtable>customer</dbtable>//A data source granularity is a
            column (set)
        <tblcolumns>id,address,age,leyel</tblcolumns>
      </connection>
      <pushdown>
        <predicate>on</predicate>
        <project>on</project>
        <aggregate>on</aggregate>
        <groupby>on</groupby>
        <having>on</having>
        <join>on</join>
        <set>on</set>
      </pushdown>
      <cache>no</cache>
      <workload>yes<workload> //Whether to allow the query engine to
monitor load of the data source
    </datasource>
    <datasource> //A third data source is hive2
      <connection>
        <url>jdbc:hive2://hive_host:10000/hivedb</url>
        <user>null</user> //NULL indicates no user name and password
authentication is required
        <dbtable>apps_download_history</dbtable>
        <tblpartitions> //A data source granularity is a "table partition"
            date between '20160101' and '20160630'
        </tblpartitions>
      </connection>
      <pushdown>
        <predicate>on</predicate>
        <project>on</project>
        <aggregate> //Only a specific aggregate function is allowed to be
pushed down, and all other functions are not allowed to be pushed down
            //"myudf _*" is a pattern matching expression, and all aggregate
functions whose names match this expression can be pushed down
            //for example, myudf_1 and myudf_23
          <allowed>count,min,max,myudf_*</allowed>
          <disallowed>*</disallowed>
        </aggregate>
        <groupby>off</groupby>
        <having>off</having>
        <join>off</join>
        <set>off</set>
      </pushdown>
      <crossdc>yes</crossdc>
      <workload>no</workload>
    </datasource>
</Data SourceConfig>
```

Figure 3:
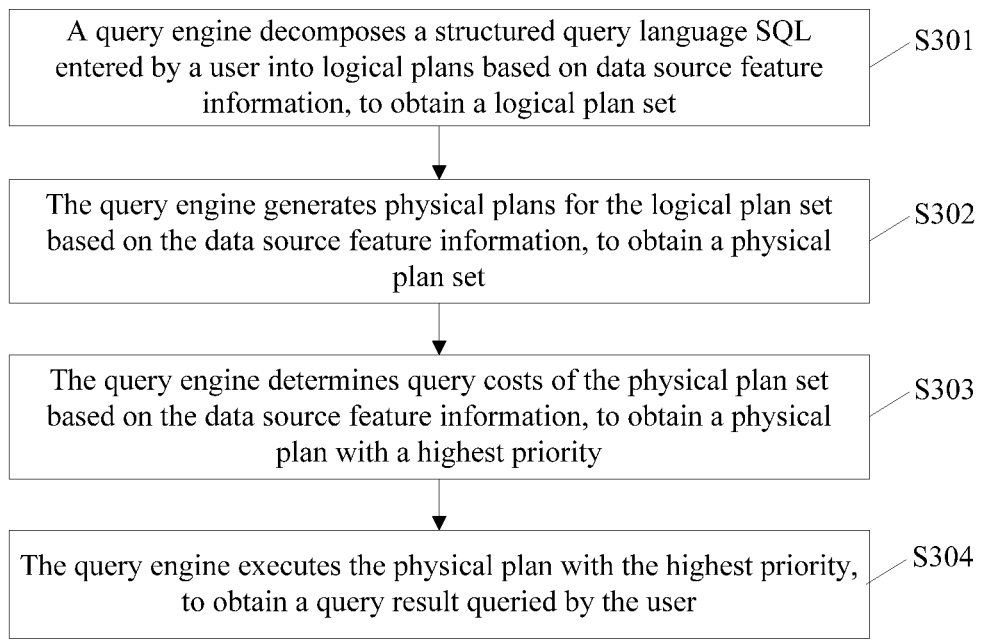
FIG. 3 is a schematic flowchart of a query processing method according to an embodiment of this application.

FIG. 3 is a schematic flowchart of a query processing method according to an embodiment of this application. The method includes the following operations:

Operation S301. A query engine decomposes a structured query language SQL entered by a user into logical plans based on data source feature information, to obtain a logical plan set, where the data source feature information is stored in an internal data source feature library of the query engine, and the internal data source feature library is stored in cache space of the query engine.

Operation S302. The query engine generates physical plans for the logical plan set based on the data source feature information, to obtain a physical plan set.

Operation S303. The query engine determines query costs of the physical plan set based on the data source feature information, to obtain a physical plan with a highest priority.

Operation S304. The query engine executes the physical plan with the highest priority, and performs data processing on an execution result of the physical plan with the highest priority, to obtain a query result queried by the user.

In an example of this application, before operation S301, the method shown in FIG. 3 further includes:

parsing and optimizing, by the query engine, the SQL entered by the user, to obtain an optimized logical plan, where the logical plan includes identification information of a data source referenced by the SQL; and reading, by the query engine from the internal data source feature library based on the identification information of the data source, data source feature information corresponding to the data source referenced by the SQL.

In one embodiment, after receiving the SQL entered by the user, the query engine first parses a syntax of the SQL. After the syntax is successfully parsed, the SQL entered by the user is converted into a structured abstract syntax tree (AST). A leaf node of the AST represents data provided by the data source, and a non-leaf node represents an SQL calculation operation. This AST is equivalent to a logical plan in the query engine. Then, the query engine performs semantic analysis on the AST, determines whether the data source of the leaf node of the AST exists, and determines whether the SQL calculation operation of the non-leaf node of the AST conforms to logic. Finally, the query engine performs rule-based optimization (RBO) such as calculation combination and calculation ordering on the AST on which semantic analysis is performed, to obtain an optimized logical plan. The optimized logical plan includes the identification information of the data source referenced by the SQL.

The query engine queries, based on the identification information of the data source referenced by the SQL, whether the internal data source feature library has corresponding data source feature information. If it is found that the internal data source feature library has the corresponding data source feature information, the query engine subsequently performs a subsequent operation based on the corresponding data source feature information. If it is found that the internal data source feature library does not have corresponding data source feature information, the query engine subsequently performs a subsequent operation in a default manner (for example, a cross-data center relational database management system (RDBMS) of heterogeneous data sources).

Further, in an example of this application, when there are N data sources referenced by the SQL, the N data sources each correspond to one piece of data source feature information, where N is a positive integer. A specific implementation of operation S301 is as follows: The query engine decomposes the SQL into logical plans based on N pieces of data source feature information, to obtain a logical plan set, where the logical plan set includes X logical plans, and X is a positive integer.

In one embodiment, if there are N data sources referenced by the SQL, the query engine performs data source decomposition on the SQL based on data source feature information of the N data sources, to obtain X logical plans. The X logical plans may be represented by an SQL 1, an SQL 2, . . . , and an SQL X, where an SQL i represents a logical plan for the N data sources. Each of the X logical plans corresponds to N logical sub-plans. For example, SQL 1=F1(SQL 11, SQL 12, . . . , SQL 1N), and F1 is a reconstruction function that is used to reconstruct data of the N logical sub-plans.

Further, in an example of this application, a specific implementation of operation S302 is as follows: The query engine generates physical plans for the X logical sub-plans based on the N pieces of data source feature information, to obtain a physical plan set, where the physical plan set includes Y physical plans, and Y is greater than or equal to X.

In one embodiment, the query engine generates at least one physical execution plan for each logical plan based on data source feature information corresponding to the logical plan, to obtain a physical plan set. The physical plan set includes Y physical plans, and the Y physical plans are represented by PHY 1, PHY 2, . . . , and PHY Y. Each of the Y physical plans corresponds to N physical sub-plans. For example, PHY 1=F2(PHY 11, PHY 12, . . . , PHY 1N), and F2 is a reconstruction function that is used to reconstruct data of the N physical sub-plans.

Further, in an example of this application, a specific implementation of step S303 is as follows: The query engine separately determines query costs of the Y physical plans based on the N pieces of data source feature information, to obtain a physical plan with a highest priority in the Y physical plans.

In one embodiment, the Y physical plans have a same execution result but different execution costs. Therefore, the query engine needs to determine the query costs of the Y physical plans based on the N pieces of data source feature information, to obtain the physical plan with the highest priority in the Y physical plans. The physical plan with the highest priority is represented by OPT_PHY.

Further, in an example of this application, a specific implementation of step S304 is as follows: The query engine executes the physical plan with the highest priority in the Y physical plans, to obtain N result sets, and reconstructs data of the N result sets based on a reconstruction function, to obtain the query result queried by the user.

In one embodiment, because each of the physical plans corresponds to N physical sub-plans, N physical sub-plans corresponding to the executed OPT_PHY may be represented by OPT_PHY 1, OPT_PHY 2, . . . , and OPT_PHY N. The query engine executes OPT_PHY 1, OPT_PHY 2, . . . , and OPT_PHYN to obtain N results sets, and the N result sets may be represented by R1, R2, . . . , and Rn. The query engine reconstructs data of the N result sets based on a reconstruction function F3, to obtain a query result U=F3(R1, R2, . . . , Rn) queried by the user, and finally outputs the query result U.

In an example of this application, the data source feature information includes at least one of the following: identification information of a data source, a data source granularity, calculation that the data source allows to push down, calculation that the data source does not allow to push down, an SQL syntax used to push down calculation to the data source, cross-DC information of the data source, whether to provide cache support information for the data source, and whether to monitor load information of the data source.

It can be learned that in the solution provided in this embodiment of this application, the query engine only needs to search the statically configured internal data source feature library based on the identification information of the data source, to obtain the data source feature information, and then query the SQL based on the data source feature information, with no need to access the data source in real time during each SQL query, thereby greatly reducing overheads of remote data source access, and improving performance of the query engine.

For example, it is assumed that a form of the SQL entered by the user is as follows:
SELECT F1(C1, C2, . . . , Ch), F2(C1, C2, . . . , Ch), . . . , Fg(C1, C2, . . . , Ch)
FROM T1, T2, . . . , Tm
WHERE exp
(1) It is assumed that tables T1, T2, . . . , and Tm belong to N different data sources, where N, m, h, and g each are a positive integer, and m≥N. The query engine performs data source decomposition on the SQL entered by the user, to obtain the following group of logical sub-plans for the m tables and the N data sources:
SELECT T1_F1(C1, C2, . . . , Ch), T1_Fg(C1, C2, . . . , Ch)
FROM T1
WHERE T1_exp;
. . .
SELECT Tm_F1(C1, C2, . . . , Ch), Tm_Fg(C1, C2, . . . , Ch)
FROM Tm
WHERE Tm_exp
(2) The query engine searches the internal data source feature library based on identification information of a data source to which the table Ti (i=1, m) belongs.
(2.1) If the query engine does not find data source feature information corresponding to Ti, the query engine adds, in a default manner, a candidate physical plan SELECT C1, . . . , Ch FROM Ti to a candidate physical plan set corresponding to the data source to which Ti belongs.
Specific operations are (2.1.1) to (2.1.3):
(2.1.1) Execute SELECT C1, . . . , Ch FROM Ti, in other words, a project (project) operation on columns C1, . . . , Ch, which is completed on a data source end by scanning the table Ti.
(2.1.2) Execute Ti_F1(C1, C2, . . . , Ch), . . . , Ti_Fg(C1, C2, . . . , Ch), in other words, calculation of Ti_F1, Ti_F2, . . . , and Ti_Fg, which is completed on a query engine end.
(2.1.3) Perform a WHERE Ti_exp filter operation, in other words, calculation of Ti_exp, which is completed on the query engine end.
(2.2) If the query engine finds data source feature information corresponding to Ti, the query engine performs optimization processing in (2.2.1) to (2.2.2) based on a specific calculation formula Ti_Fj (i=1, . . . , m; j=1, . . . , g) and the data source feature information corresponding to Ti.
(2.2.1) If all Ti_Fj is an aggregate operation, the query engine "pushes down calculation of Ti_Fj to the data source to which Ti belongs" based on "<Aggregate>" feature descriptions about Ti in a data source feature library if Ti_Fj is an aggregate operation supported by the data source corresponding to Ti, for example, a system aggregate function such as sum (sum), count (count), averaging (avg), maximization (max), or minimization (min) supported by an RDBMS. If all Ti_Fj supports calculation push-down, the query engine adds a candidate physical plan SELECT Ti_F1(C1, C2, . . . , Ch), . . . , Ti_Fg(C1, C2, . . . , Ch) FROM Ti to s candidate physical plan set corresponding to the data source to which Ti belongs; otherwise, the query engine does not add the candidate physical plan.

(2.2.2) If some of Ti_Fj are an aggregate operation, and some are a non-aggregate operation, for Ti_Fj that is not an aggregate operation, the query engine "pushes down calculation of Ti_Fj to the data source to which Ti belongs" based on "<project>" feature descriptions about Ti in a data source feature library if Ti_Fj is a project (project) operation such as arithmetic operations including add, subtract, multiply, and divide supported by the data source corresponding to Ti. In addition, for the aggregate operation, the query engine can push down calculation to the data source to which Ti belongs based on (2.1). In this case, the query engine adds a candidate physical plan SELECT Ti_F1(C1, C2, . . . , Ch), . . . , Ti_Fg(C1, C2, . . . , Ch) FROM Ti to a candidate physical plan set corresponding to the data source to which Ti belongs; otherwise, the query engine does not add the candidate physical plan.

(2.3) If Ti_exp is a designated "<predicate>" operation that can be supported in a data source feature library, "calculation of Ti_exp is pushed down to the data source corresponding to Ti". For the physical plan in the candidate physical plan set generated in (2.1), a calculation push-down clause "where Ti_exp" is separately added, to generate a new physical plan:

SELECT C1, . . . , Ch FROM Ti where Ti_exp.

For the physical plan in the candidate physical plan set that may be generated in (2.2), the calculation push-down clause "where Ti_exp" is separately added, to generate a new physical plan:

SELECT Ti_F1(C1, C2, . . . , Ch), . . . , Fg(C1, C2, . . . , Ch) FROM Ti where Ti_exp.

Otherwise, calculation of Ti_exp is not pushed down.

(3) SQL cost calculation and determining:

One physical plan is selected from a candidate physical plan set in each of the N data sources, to obtain N independent physical plans, and an entire physical plan for the SQL statement entered by the user is formed together with a reconstruction operation of the query engine.

It is assumed that there are y_i physical plans in a candidate physical plan set corresponding to a data source i. In this case, a quantity of entire physical plans is Y=y_1× y_2× . . . xy_N.

The query engine estimates, for each of the Y physical plans based on the data source feature information, an execution time T_1 of the data source, a time T_2 of transmitting data from the data source to the query engine, and a time T_3 used by the query engine to reconstruct and output an SQL query result of the user. Therefore, a total execution delay of each physical plan is ExecTime=T_1+ T_2+T_3. Finally, the query engine selects a physical plan with a lowest delay as the physical plan with the highest priority for execution. For estimation of an execution time that is not related to the data source feature information, an existing cost determining technology is used, and is not described herein.

Figure 4:
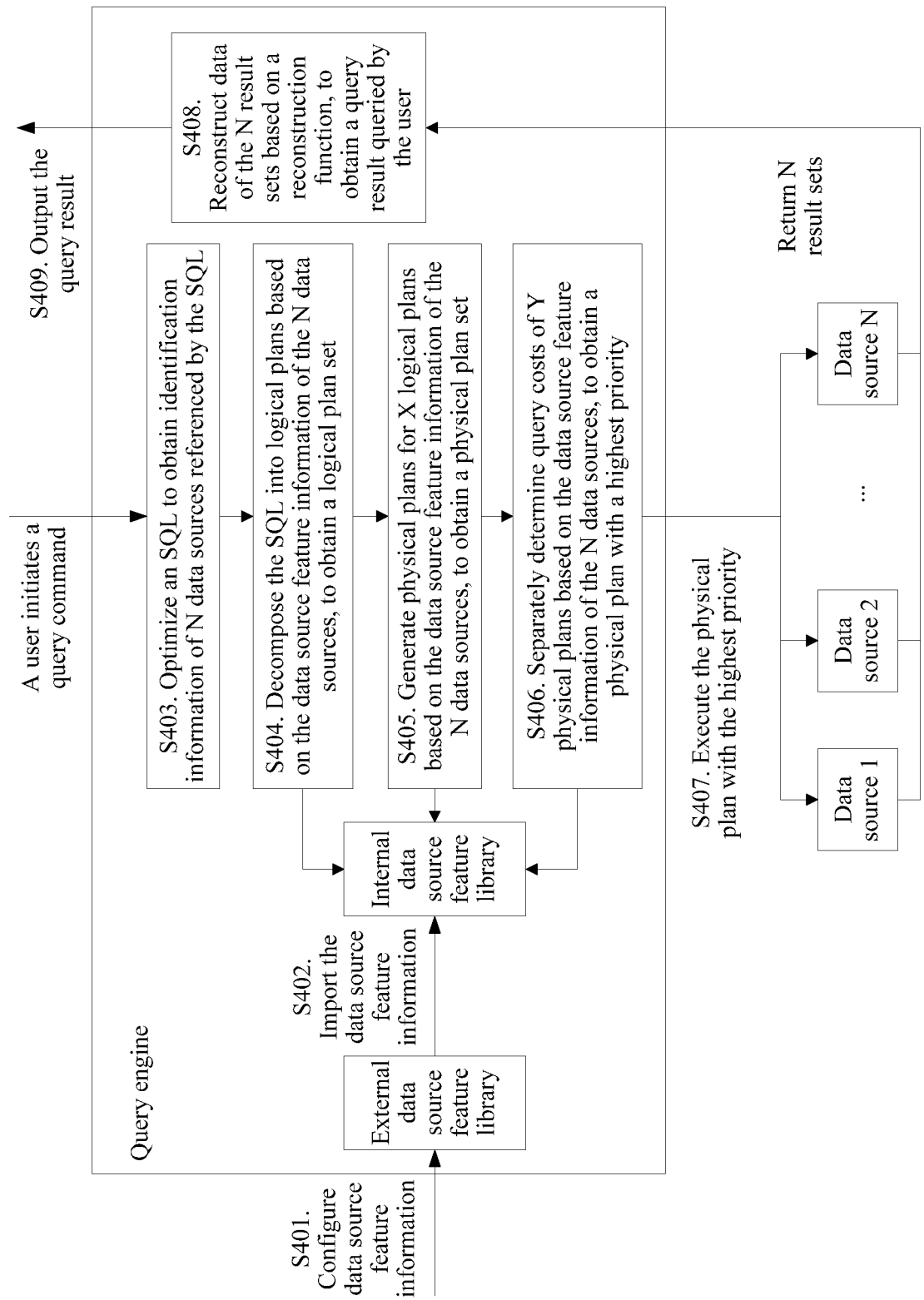
FIG. 4 is a schematic flowchart of another query processing method according to an embodiment of this application.

FIG. 4 is a schematic flowchart of another query processing method according to an embodiment of this application. The method includes the following operations:

Operation S401. A query engine configures at least two types of external data source feature information into an external data source feature library of the query engine based on a general registration template.

Operation S402. The query engine imports data source feature information in the external data source feature library into an internal data source feature library of the query engine, where the external data source feature library is stored in storage space of the query engine.

Operation S403. When the query engine receives a query command initiated by a user, the query command carries an SQL, and the query engine optimizes the SQL to obtain an optimized logical plan, where the optimized logical plan includes identification information of N data sources referenced by the SQL.

Operation S404. The query engine reads data source feature information of the N data sources from the internal data source feature library of the query engine based on the identification information of the N data sources, and decomposes the SQL into logical plans based on the data source feature information of the N data sources, to obtain a logical plan set, where the logical plan set includes X logical plans, and X is a positive integer.

Operation S405. The query engine generates physical plans for the X logical plans based on the data source feature information of the N data sources, to obtain a physical plan set, where the physical plan set includes Y physical plans, and Y is greater than or equal to X.

Operation S406. The query engine separately determines query costs of the Y physical plans based on the data source feature information of the N data sources, to obtain a physical plan with a highest priority in the Y physical plans.

Operation S407. The query engine executes the physical plan with the highest priority in the Y physical plans, to obtain N result sets.

Operation S408. The query engine reconstructs data of the N result sets based on a reconstruction function, to obtain a query result queried by the user.

Operation S409. The query engine outputs the query result.

It should be noted that for a specific implementation of step S401 to step S409 in this embodiment of this application, refer to the foregoing query processing method and the foregoing data source registration method. Details are not described herein again.

The methods in the embodiments of this application are described in detail above, and apparatuses in the embodiments of this application are provided below.

Figure 5:
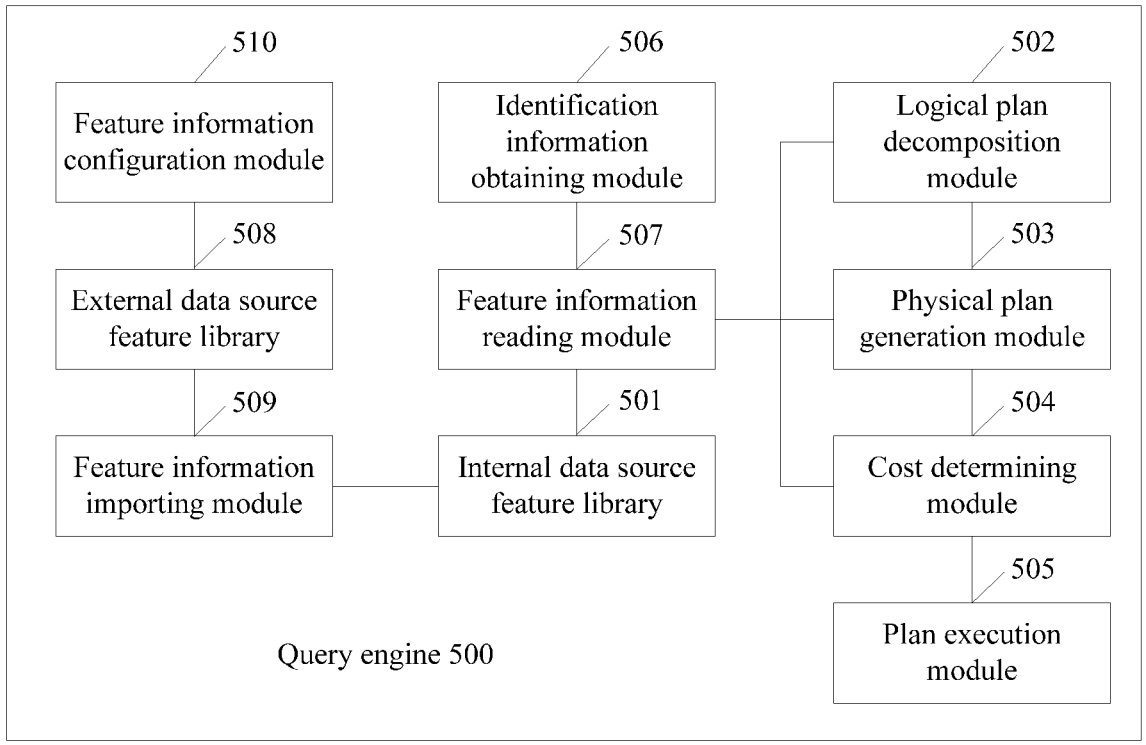
FIG. 5 is a schematic structural diagram of a query engine according to an embodiment of this application.

FIG. 5 is a schematic structural diagram of a query engine according to an embodiment of this application. The query engine may include an internal data source feature library 501, a logical plan decomposition module 502, a physical plan generation module 503, a cost determining module 504, and a plan execution module 505. Detailed descriptions of the modules are as follows:

The internal data source feature library 501 is configured to store data source feature information, where the internal data source feature library is stored in cache space of the query engine.

The logical plan decomposition module 502 is configured to decompose a structured query language SQL entered by a user into logical plans based on the data source feature information, to obtain a logical plan set.

The physical plan generation module 503 is configured to generate physical plans for the logical plan set based on the data source feature information, to obtain a physical plan set.

The cost determining module 504 is configured to determine query costs of the physical plan set based on the data source feature information, to obtain a physical plan with a highest priority.

The plan execution module 505 is configured to execute the physical plan with the highest priority, to obtain a query result queried by the user.

In an example of this application, the query engine further includes:

an identification information obtaining module 506, configured to obtain identification information of a data source referenced by the SQL; and a feature information reading module 507, configured to: send an information obtaining request to the internal data source feature library 501, where the information obtaining request carries the identification information of the data source referenced by the SQL; and receive data source feature information that corresponds to the data source referenced by the SQL and that is sent by the internal data source feature library 501 for the information obtaining request.

In an example of this application, the identification information obtaining module is specifically configured to:

parse and optimize the SQL to obtain an optimized logical plan, where the logical plan includes the identification information of the data source referenced by the SQL.

In an example of this application, when there are N data sources referenced by the SQL, the N data sources each correspond to one piece of data source feature information, where N is a positive integer, and the logical plan decomposition module 502 is specifically configured to:

decompose the SQL into logical plans based on N pieces of data source feature information, to obtain a logical plan set, where the logical plan set includes X logical plans, and X is a positive integer.

In an example of this application, the physical plan generation module 503 is specifically configured to:

generate physical plans for the X logical plans based on the N pieces of data source feature information, to obtain a physical plan set, where the physical plan set includes Y physical plans, and Y is greater than or equal to X.

In an example of this application, the cost determining module 504 is specifically configured to:

separately determine query costs of the Y physical plans based on the N pieces of data source feature information, to obtain a physical plan with a highest priority in the Y physical plans.

In an example of this application, the plan execution module 505 is specifically configured to:

execute the physical plan with the highest priority in the Y physical plans, to obtain N result sets; and reconstruct data of the N result sets based on a reconstruction function, to obtain the query result queried by the user.

In an example of this application, the data source feature information includes at least one of the following: identification information of a data source, a data source granularity, calculation that the data source allows to push down, calculation that the data source does not allow to push down, an SQL syntax used to push down calculation to the data source, cross-data center information of the data source, whether to provide cache support information for the data source, and whether to monitor load information of the data source.

In an example of this application, the data source granularity includes at least one of a file, a database, a table in the database, a row in the table, and a column in the table.

In an example of this application, the query engine further includes:

an external data source feature library 508, configured to store data source feature information, where the external data source feature library is stored in storage space of the query engine; and a feature information importing module 509, configured to import the data source feature information in the external data source feature library 508 into the internal data source feature library of the query engine.

In an example of this application, the query engine further includes:

a feature information configuration module 510, configured to configure at least two types of external data source feature information into the external data source feature library of the query engine based on a general registration template.

It should be noted that the foregoing modules (the internal data source feature library 501, the logical plan decomposition module 502, the physical plan generation module 503, the cost determining module 504, the plan execution module 505, the identification information obtaining module 506, the feature information reading module 507, the external data source feature library 508, the feature information importing module 509, and the feature information configuration module 510) are configured to perform related steps of the foregoing query processing method.

In this embodiment, the query engine 500 is presented in a form of modules. The "module" herein may be an application-specific integrated circuit (application-specific integrated circuit, ASIC), a processor and a memory that execute one or more software or firmware programs, an integrated logic circuit, and/or another component that can provide the foregoing functions. In addition, the logical plan decomposition module 502, the physical plan generation module 503, the cost determining module 504, the plan execution module 505, the identification information obtaining module 506, the feature information reading module 507, the feature information importing module 509, and the feature information configuration module 510 may be implemented by a processor 701 of a query engine shown in FIG. 7, and the internal data source feature library 501 may be implemented by a memory 702 of the query engine shown in FIG. 7.

Figure 6:
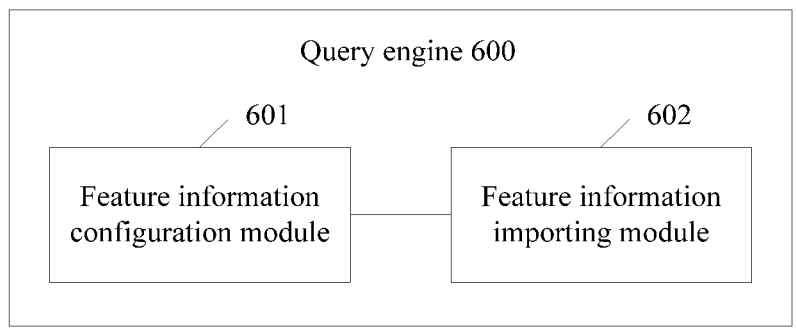
FIG. 6 is a schematic structural diagram of another query engine according to an embodiment of this application.

FIG. 6 is a schematic structural diagram of a query engine according to an embodiment of this application. The query engine may include a feature information configuration module 601 and a feature information importing module 602. Detailed descriptions of the modules are as follows:

The feature information configuration module 601 is configured to configure external data source feature information into an external data source feature library of the query engine, where the external data source feature library is stored in storage space of the query engine, and different data source feature information is stored in a same external data source feature library.

The feature information importing module 602 is configured to import data source feature information in the external data source feature library of the query engine into an internal data source feature library of the query engine, where the internal data source feature library is stored in cache space of the query engine, and at least two types of data source feature information are stored in a same internal data source feature library.

In an example of this application, the feature information configuration module 601 is specifically configured to:

configure the external data source feature information into the external data source feature library of the query engine by using a tool program of the query engine, where at least two types of external data source feature information correspond to a same tool program.

In an example of this application, the feature information importing module 602 is specifically configured to:

import the data source feature information in the external data source feature library of the query engine into the internal data source feature library of the query engine by using an importing program of the query engine, where at least two types of data source feature information correspond to a same importing program.

In an example of this application, at least two types of external data source feature information are configured into the external data source feature library of the query engine based on a general registration template.

In an example of this application, the data source feature information includes at least one of the following: identification information of a data source, a data source granularity, calculation that the data source allows to push down, calculation that the data source does not allow to push down, an SQL syntax used to push down calculation to the data source, cross-data center information of the data source, whether to provide cache support information for the data source, and whether to monitor load information of the data source.

In an example of this application, the data source granularity includes at least one of a file, a database, a table in the database, a row in the table, and a column in the table.

It should be noted that the foregoing modules (the feature information configuration module 601 and the feature information importing module 602) are configured to perform related steps of the foregoing data source registration method.

In this embodiment, the query engine 600 is presented in a form of modules. The "module" herein may be an application-specific integrated circuit (ASIC), a processor and a memory that execute one or more software or firmware programs, an integrated logic circuit, and/or another component that can provide the foregoing functions. In addition, the feature information configuration module 601 and the feature information importing module 602 may be implemented by a processor 701 of a query engine shown in FIG. 7.

Figure 7:
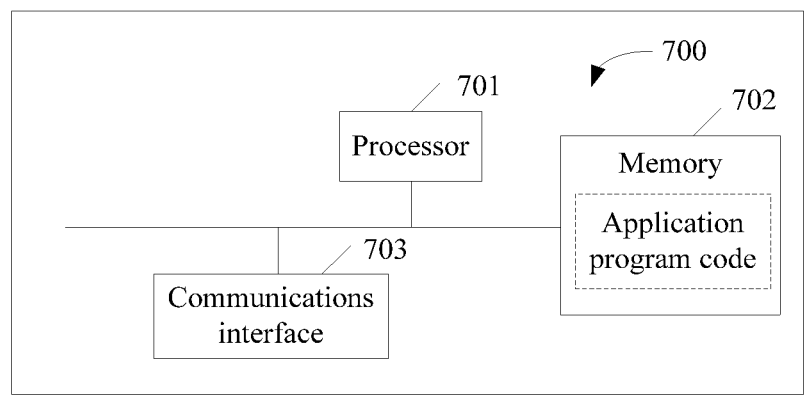
FIG. 7 is a schematic structural diagram of still another query engine according to an embodiment of this application.

FIG. 7 shows a query engine 700 according to an embodiment of this application. The query engine 700 includes at least one processor 701, at least one memory 702, and at least one communications interface 703. The processor 701 is connected to the memory 702 and the communications interface 703 by using a bus and completes mutual communication by using the bus.

The processor 701 may be a general-purpose central processing unit (CPU for short). If the processor 701 is one CPU, the CPU may be a single-core CPU, or may be a multi-core CPU. The processor 701 may be alternatively a microprocessor, an application-specific integrated circuit (ASIC), or one or more integrated circuits configured to control program execution of the foregoing solutions.

The communications interface 703 is configured to communicate with another device or communications network, such as an Ethernet, a radio access network (RAN), or a wireless local area network (WLAN).

The memory 702 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM), or other compact disc storage, optical disc storage (including a compact disc, a laser disc, an optical disc, a digital versatile disc, a Blu-ray disc, or the like), a disk storage medium or another disk storage device, or any other medium that can be used to carry or store expected program code that has an instruction or data structure form and that can be accessed by a computer, but this is not limited herein. The memory may exist separately and is connected to the processor by using the bus, or the memory may be integrated with the processor.

The memory 702 is configured to store application program code that executes the foregoing solutions, and the processor 701 controls the execution. The processor 701 is configured to execute the application program code stored in the memory 702.

The processor 701 of the query engine 700 is configured to read the program code stored in the memory 702 and perform the following operations: decomposing a structured query language SQL entered by a user into logical plans based on data source feature information, to obtain a logical plan set; generating physical plans for the logical plan set based on the data source feature information, to obtain a physical plan set, where the data source feature information is stored in an internal data source feature library of the query engine, and the internal data source feature library is stored in cache space of the query engine; determining query costs of the physical plan set based on the data source feature information, to obtain a physical plan with a highest priority; and executing the physical plan with the highest priority, to obtain a query result queried by the user.

Alternatively, the processor 701 of the query engine 700 is configured to read the program code stored in the memory 702 and perform the following operations: configuring external data source feature information into an external data source feature library of the query engine, where the external data source feature library is stored in storage space of the query engine; and importing data source feature information in the external data source feature library of the query engine into an internal data source feature library of the query engine, where the internal data source feature library is stored in cache space of the query engine, and at least two types of data source feature information are stored in a same internal data source feature library.

It should be noted that, for implementation of each operation, refer to corresponding descriptions of the method embodiments shown in FIG. 2 to FIG. 4.

An embodiment of this application further provides a computer storage medium. The computer storage medium may store a program. When the program is executed, some or all of the steps in any query processing method recorded in the foregoing method embodiments are performed.

An embodiment of this application further provides a computer storage medium. The computer storage medium may store a program. When the program is executed, some or all of the steps in any data source registration method recorded in the foregoing method embodiments are performed.

It should be noted that, for brief description, the foregoing method embodiments are represented as a series of actions. However, a person skilled in the art should appreciate that this application is not limited to the described order of the actions, because according to this application, some steps may be performed in other orders or simultaneously. In addition, it should be further appreciated by a person skilled in the art that the embodiments described in this specification are example embodiments, and the involved actions and modules are not necessarily required by this application.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage. Based on such an understanding, the technical solutions of this application essentially, or the part contributing to the prior art, or all or some of the technical solutions may be implemented in a form of a software product. The computer software product is stored in a storage and includes several instructions for instructing a computer device (which may be a personal computer, a server, a network device, or the like) to perform all or some of the steps of the methods described in the embodiments of this application. The foregoing storage includes: any medium that can store program code, such as a USB flash drive, a read-only memory (ROM), a random access memory (RAM), a removable hard disk, a magnetic disk, or an optical disc.

A person of ordinary skill in the art may understand that all or some of the steps of the methods in the embodiments may be implemented by a program instructing relevant hardware. The program may be stored in a computer readable storage. The storage may include a flash memory, a read-only memory (ROM for short), a random access memory (RAM for short), a magnetic disk, an optical disc, or the like.

The embodiments of this application are described in detail above. The principle and implementation of this application are described herein through specific examples. The description about the embodiments is merely provided to help understand the method and core ideas of this application. In addition, a person of ordinary skill in the art can make variations and modifications to this application in terms of the specific implementations and application scopes based on the ideas of this application. Therefore, the content of this specification shall not be construed as a limit to this application.

What is claimed is:

1. A method, comprising:
    obtaining identification information of a data source referenced by a structured query language (SQL) from a user;
    reading, from an internal storage space of a query engine based on the identification information of the data source, data source feature information corresponding to the data source referenced by the SQL;
    decomposing the SQL into logical plans based on the data source feature information to obtain a logical plan set, wherein the data source feature information is imported from an external storage space of the query engine and stored in the internal storage space of the query engine;
    generating physical plans for the logical plan set based on the data source feature information to obtain a physical plan set;
    determining query costs of the physical plan set based on the data source feature information to obtain a physical plan; and
    executing the physical plan to obtain a query result of the SQL to return to the user.

2. The method according to claim 1, further comprising:
    configuring the data source feature information into the external storage space of the query engine.

3. The method according to claim 2, further comprising:
    configuring at least two types of the data source feature information into an external data source feature library of the query engine based on a general registration template.

4. The method according to claim 1, wherein the obtaining of the identification information of the data source referenced by the SQL comprises:
    optimizing the SQL to obtain an optimized logical plan, wherein the logical plan comprises the identification information of the data source referenced by the SQL.

5. The method according to claim 1, wherein when there are N data sources referenced by the SQL, the N data sources each corresponds to one piece of the data source feature information, wherein N is a positive integer, and the decomposing of the SQL into the logical plans based on data source feature information to obtain the logical plan set comprises:
    decomposing the SQL into the logical plans based on N pieces of the data source feature information to obtain the logical plan set, wherein the logical plan set comprises X logical plans, and X is a positive integer.

6. The method according to claim 1, wherein the data source feature information comprises at least one of the following:
    a data source granularity,
    calculation that the data source allows to push down,
    calculation that the data source does not allow to push down,
    an SQL syntax used to push down calculation to the data source,
    cross-data center information of the data source,
    whether to provide cache support information for the data source, and
    whether to monitor load information of the data source.

7. A system, comprising:

a hardware processor;

a memory, coupled to the hardware processor and storing one or more instructions that, when executed by the hardware processor, cause the system to implement steps of:

configuring data source feature information into an external storage space of a query engine;

importing the data source feature information from the external storage space of the query engine into an internal storage space of the query engine, wherein a data source corresponding to the data source feature information referenced by a structured query language (SQL) is queried by obtaining identification information of the data source;

reading, from the internal storage space of the query engine based on the identification information of the data source, the data source feature information corresponding to the data source;

decomposing the SQL into logical plans based on the data source feature information to obtain a logical plan set, wherein the data source feature information is stored in the internal storage space of the query engine;

generating physical plans for the logical plan set based on the data source feature information to obtain a physical plan set;

determining query costs of the physical plan set based on the data source feature information to obtain a physical plan; and executing the physical plan to obtain a query result of the SQL to return to a user.

8. The system according to claim 7, wherein at least two types of the data source feature information are stored in a same internal data source feature library of the query engine.

9. The system according to claim 8, wherein the at least two types of the data source feature information are configured into an external data source feature library of the query engine based on a general registration template.

10. The system according to claim 7, wherein the configuring of the data source feature information into the external storage space of the query engine comprises:

configuring the data source feature information into the external storage space of the query engine by using a tool program of the query engine, wherein at least two types of the data source feature information correspond to a same tool program.

11. The system according to claim 7, wherein the importing of the data source feature information from the external storage space of the query engine into the internal storage space of the query engine comprises:

importing the data source feature information from the external storage space of the query engine into the internal storage space of the query engine by using an importing program of the query engine, wherein at least two types of the data source feature information correspond to a same importing program.

12. The system according to claim 7, wherein the data source feature information comprises at least one of the following:

a data source granularity, calculation that the data source allows to push down, calculation that the data source does not allow to push down, an SQL syntax used to push down calculation to the data source, cross-data center information of the data source, whether to provide cache support information for the data source, and whether to monitor load information of the data source.

13. A non-transitory computer-readable storage medium storing one or more instructions that, when executed by a hardware processor, cause the hardware processor to:

store data source feature information imported from an external storage space of a query engine in an internal storage space of the query engine;

obtain identification information of a data source referenced by a structured query language (SQL) from a user;

read, from the internal storage space of the query engine based on the identification information of the data source, the data source feature information corresponding to the data source referenced by the SQL;

decompose the SQL, into logical plans based on the data source feature information, to obtain a logical plan set;

generate physical plans for the logical plan set based on the data source feature information, to obtain a physical plan set;

determine query costs of the physical plan set based on the data source feature information to obtain a physical plan; and execute the physical plan to obtain a query result to return to the user.

14. The non-transitory computer-readable storage medium according to claim 13, wherein the instructions further cause the hardware processor to:

store the data source feature information in the external storage space of the query engine.

15. The non-transitory computer-readable storage medium according to claim 13, wherein the instructions further cause the hardware processor to be configured to parse and optimize the SQL to obtain an optimized logical plan, wherein the logical plan comprises the identification information of the data source referenced by the SQL.

* * * * *